(12) United States Patent
Grimaud

(10) Patent No.: US 12,126,162 B2
(45) Date of Patent: Oct. 22, 2024

(54) ELECTRICAL CONVERSION SYSTEM OF MULTILEVEL TYPE PROTECTED AGAINST AN ELECTRICAL OVERLOAD

(71) Applicant: SAFRAN ELECTRONICS & DEFENSE, Paris (FR)

(72) Inventor: Louis Grimaud, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 78 days.

(21) Appl. No.: 17/889,627

(22) Filed: Aug. 17, 2022

(65) Prior Publication Data
US 2023/0071957 A1    Mar. 9, 2023

(30) Foreign Application Priority Data
Aug. 18, 2021 (FR) ...................... 2108744

(51) Int. Cl.
*H02H 7/122* (2006.01)
*H02H 3/20* (2006.01)

(52) U.S. Cl.
CPC .......... *H02H 3/207* (2013.01); *H02H 7/1222* (2013.01)

(58) Field of Classification Search
CPC ............... H02H 3/24–253; H02H 3/20–22
See application file for complete search history.

(56) References Cited

U.S. PATENT DOCUMENTS

| | | |
|---|---|---|
| 2006/0265160 A1 | 11/2006 | Komulainen et al. |
| 2015/0003127 A1 | 1/2015 | Takizawa |
| 2018/0278052 A1 | 9/2018 | Yoshida |
| 2022/0393616 A1* | 12/2022 | Fujiwara ............. H02M 7/5395 |

FOREIGN PATENT DOCUMENTS

| | | | |
|---|---|---|---|
| EP | EP 2 529 476 A1 | 12/2012 | |
| FR | 2 955 719 A1 | 7/2011 | |
| WO | WO 2011/092408 A1 | 8/2011 | |
| WO | WO-2015189453 A1 * | 12/2015 | ............ H02M 7/483 |

OTHER PUBLICATIONS

Machine translation of WO-2015/189453A1 (Year: 2015).*

(Continued)

*Primary Examiner* — Peter M Novak
(74) *Attorney, Agent, or Firm* — Pillsbury Winthrop Shaw Pittman LLP

(57) ABSTRACT

An electrical conversion system includes an inverter arranged according to a multilevel type topology with k arms and a command device for cut-off against an electrical overload, connected to a set of first intermediate lines to measure a first intermediate continuous voltage. The cut-off command device is configured to determine a fault by detecting if the first measured intermediate continuous voltage is outside of a nominal voltage variation range [Vmax1, Vmin1] of the first intermediate voltage and to transmit a generalised opening command signal for an opening of the electronic commutation switches of each arm when the fault is determined.

12 Claims, 3 Drawing Sheets

(56) References Cited

OTHER PUBLICATIONS

Krone, T., et al., "Fast and easily implementable detection circuits for short-circuits of power semiconductors," 2015 IEEE Energy Conversion Congress and Exposition (ECCE), Sep. 2015, XP032800977, pp. 2715-2722.

Laumen, M., et al., "Ultra-Fast Short-Circuit Detection for SiC-MOSFETs Using DC-Link Voltage Monitoring," 2020 IEEE 11th International Symposium on Power Electronics for Distributed Generation Systems (PEDG), Sep. 2020, XP033854241, pp. 547-553.

Lyu, X., et al., "A Reliable Ultra-Fast Three Step Short Circuit Protection Method for E-mode GaN HEMTs," 2019 IEEE Applied Power Electronics Conference and Exposition (APEC), Mar. 2019, XP033555326, pp. 437-440.

\* cited by examiner

[Fig. 1a]
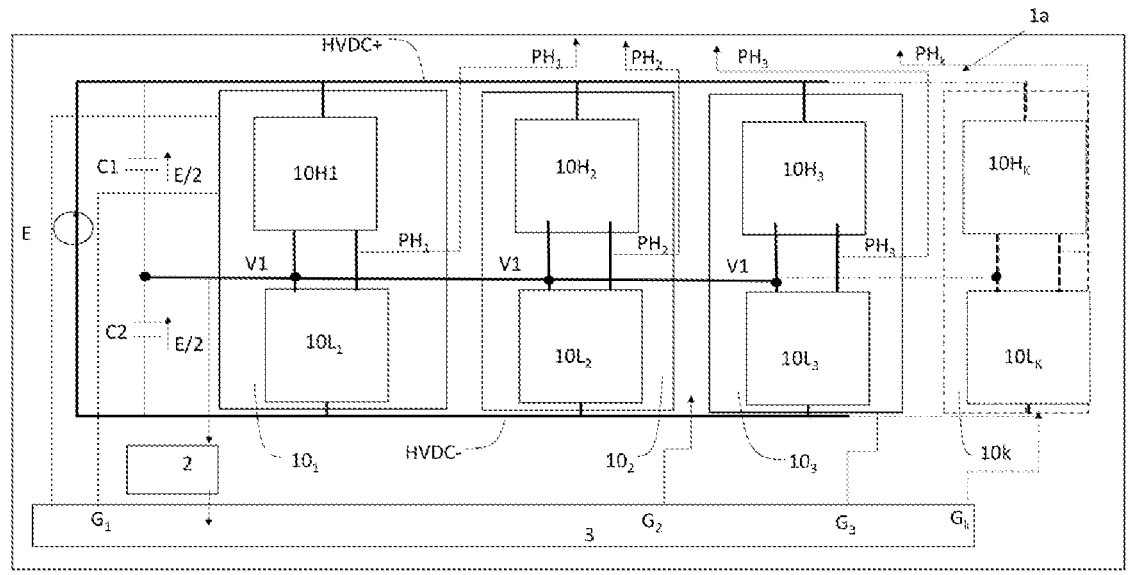
[Fig. 1b]
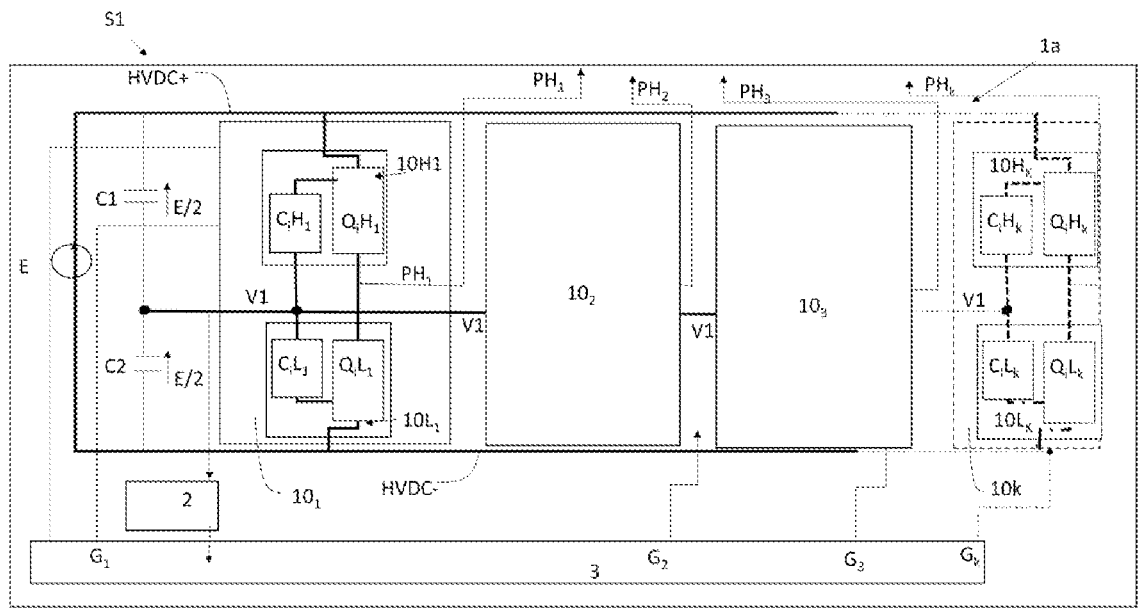

[Fig. 2]
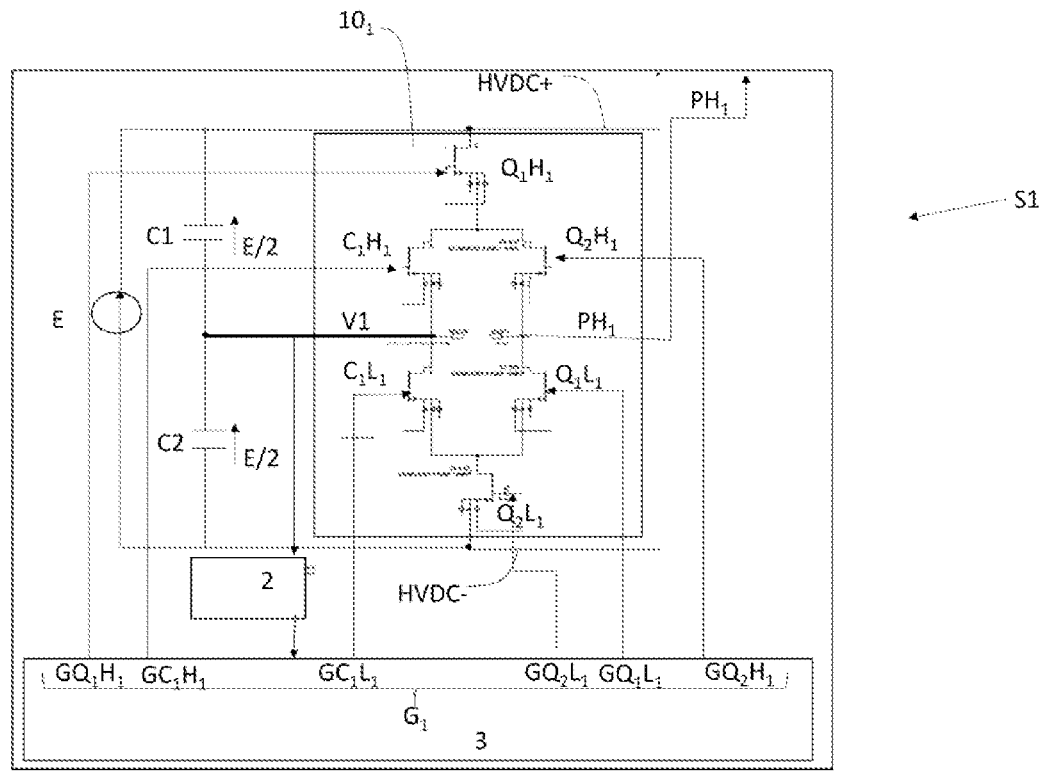
[Fig. 3]
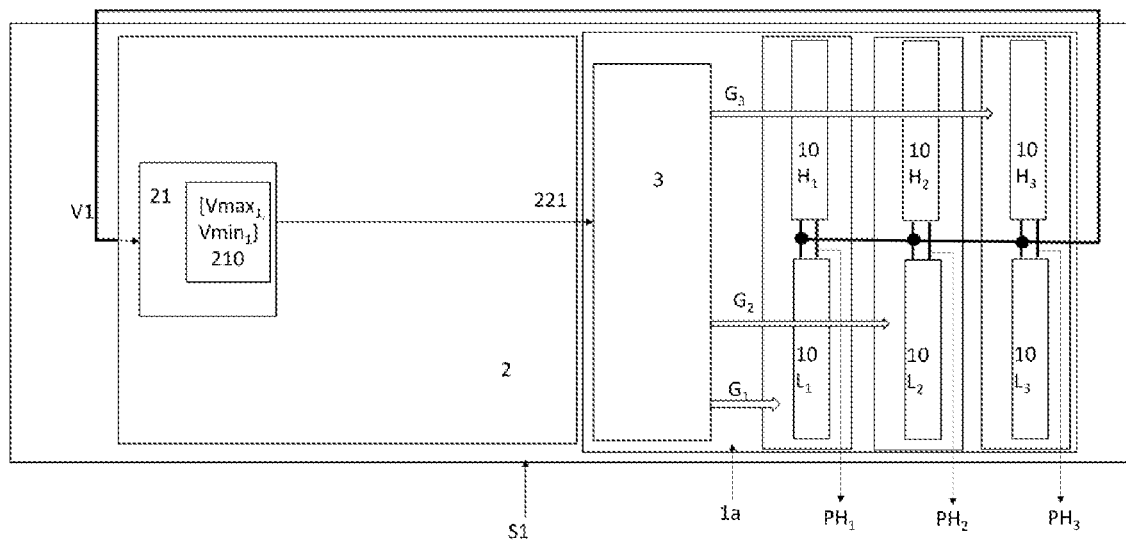

[Fig. 4]
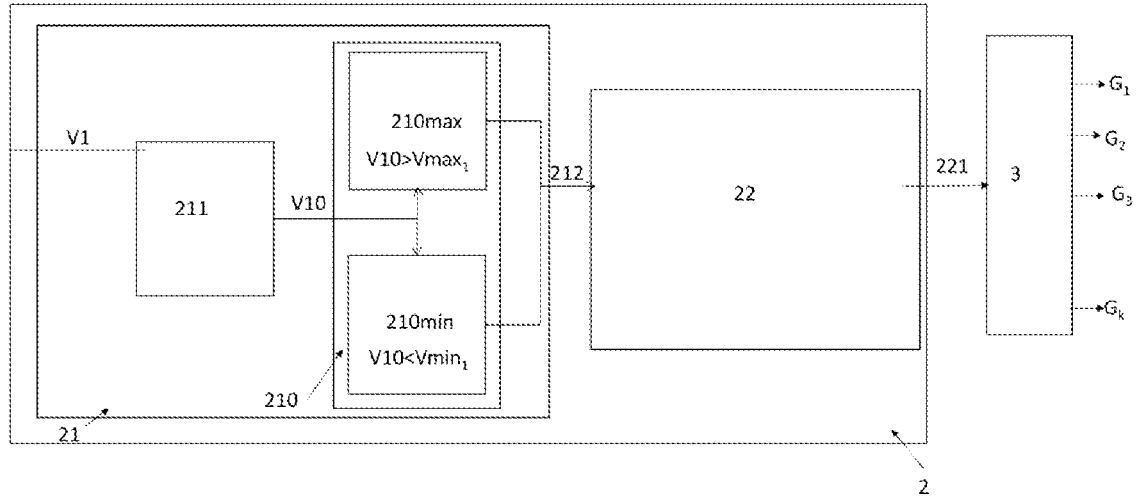
[Fig. 5]
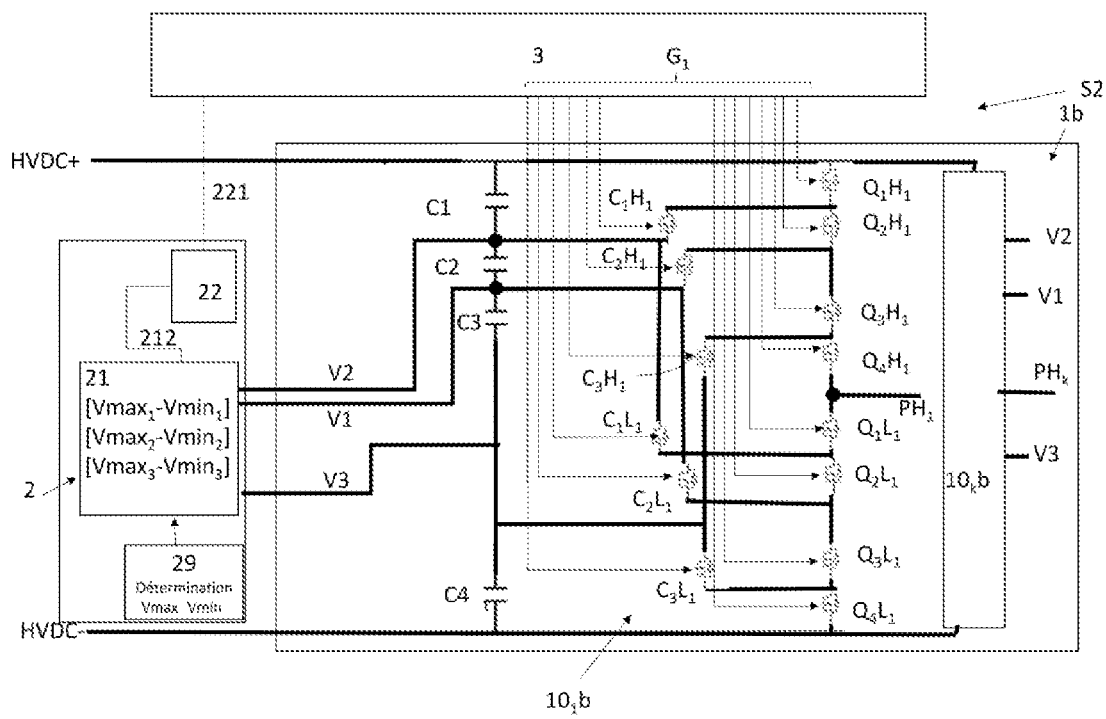
| Détermination Vmax Vmin | Determination Vmax Vmin |

ELECTRICAL CONVERSION SYSTEM OF MULTILEVEL TYPE PROTECTED AGAINST AN ELECTRICAL OVERLOAD

CROSS-REFERENCE TO RELATED APPLICATIONS

This application claims priority to French Patent Application No. 2108744, filed Aug. 18, 2021, the entire content of which is incorporated herein by reference in its entirety.

FIELD

The technical field of the invention is that of the protection against overloads of an electrical conversion system comprising a multilevel type inverter and more particularly multilevel inverters using electronic switches based on wide bandgap materials.

BACKGROUND

Inverters are converters of continuous voltage into alternating voltage. They comprise as many arms as phases of the electric charge to supply.

With the increasing electrification of aircraft, and in particular the electrification of propulsive systems, the on-board electrical network must include high and very high voltage DC supply sources, to meet the power need. In such an environment, the topologies of so-called multilevel inverters, with n voltage levels with n greater than or equal to 3 (a normal inverter is with two voltage levels (the voltage potentials of each of the two terminals each connected to a voltage bus) make it possible to reduce the voltage levels that the electronic switches have to withstand when they are commanded in the closed state: each switch in the closed state only has to withstand a fraction of the DC voltage of the supply source. These multilevel inverter technologies are also interesting for their spectral properties (fewer harmonics). The number of components necessary and the associated performances depend on the chosen multilevel topologies. Thus, a multilevel inverter comprises at least one intermediate line and two terminals forming three level lines (the intermediate line and the two lines of each terminal).

"Level line" of the inverter is taken to mean each line of intermediate voltage and each of the two terminals connected to the corresponding continuous voltage bus, thus for example a three level inverter comprises three level lines of which a single intermediate voltage line and an inverter with five levels comprises five level lines of which three intermediate voltage lines.

Whatever the multilevel inverter topology envisaged, it has to meet the safety and reliability imperatives in force in aeronautics. That is to say, such inverters must be able to continue to operate by isolating one or more arms or instead be forced into a state wherein it does not make it possible to propagate a serious breakdown, in particular affecting an on-board electrical network, in the event of failure of one or of its components, and more particularly electronic switches. In practice, two types of fault exist, namely the Open Circuit (OC) fault and/or Short-Circuit (SC) fault.

The risk of particularly critical breakdown is the short-circuit fault which leads to an abnormally high current which can collapse the on-board electrical network. This fault may be due to a short-circuit in a load at the output of the inverter, for example in a coil of a permanent magnet synchronous machine, or in an arm of the inverter and more particularly in an electronic switch. An open circuit type fault is less critical in terms of safety, because it mainly results in a degradation of the performances of the inverter, which will degrade the operation/the performances of the loads supplied by this inverter.

The focus hereafter will be on the detection of short-circuit type faults and on the neutralisation of such faults in the inverter.

When the electronic switches of the arms of the inverter are IGBT technology power transistors, a known technique for detecting a short-circuit is the measurement of IGBT transistor desaturation using a desaturation diode. One exploits the fact that in linear regime (desaturation), the current in an IGBT transistor commanded in the ON state is limited to a value imposed by the gate voltage. And in no fault regime, the collector-emitter voltage is low. A corresponding technique is for example described in the document EP2529476A1 for a conventional inverter, single level, with IGBT transistors.

Another technique for detecting a short-circuit regime is the direct measurement of current, but the solution quickly becomes very expensive as a function of the number of levels of the inverter, because it imposes integrating a current sensor or a current mirror structure per power transistor.

But, above all, it has been explained that the current trend in power electronics is for the use of power transistors of wide bandgap MOSFET type, for example SiC or GaN, which offer better performances than IGBT transistors: high voltage withstand, high commutation speed and high operating temperature. In this context, the protection by measurement at desaturation is no longer operational. Indeed, due to the intrinsic characteristics of wide bandgap transistors, in particular a very low resistance in the ON state, the reference threshold voltage for the detection of desaturation then corresponds to much too high current levels, which would be detrimental for the on-board electrical network.

Furthermore, in the event of detection of a short-circuit type fault, the protection measure consists in imposing a blocking voltage on the gate of the electronic switch concerned. But when it involves an electronic switch of wide bandgap type, the abrupt blocking of the switch may lead to a oscillation phenomenon with avalanching and over-current, which is not desired.

SUMMARY

An aspect of the invention is directed to responding to the above various problems, and in particular to propose an integrated detection of short-circuit type faults in a multilevel inverter topology, which is rapid and reliable, and easy and inexpensive to implement and to integrate. Another aspect of the invention is to propose a protection against short-circuits, integrated in the inverters and independent of the semiconductor technology and notably applicable to wide bandgap semiconductor technologies.

An aspect of the invention offers a technical solution to at least one of the aforementioned problems, by making it possible for an inverter of multilevel type (at least three levels) to have a rapid and simple detection of short-circuit.

An aspect of the invention thus relates to an electrical conversion system comprising:
  an inverter arranged according to a multilevel type topology with k identical arms mounted in parallel with respect to one another each comprising a phase output, k being an integer greater than or equal to 3, each arm comprising:

an upper half-arm comprising electronic commutation switches and clamping elements connected to a first terminal of a continuous voltage bus to supply a positive supply voltage to the phase output and a lower half-arm comprising electronic commutation switches and clamping elements connected to a second terminal of a continuous voltage bus to supply a negative supply voltage to the phase output, a first intermediate line having a first intermediate continuous voltage between a clamping element of an upper half-arm and a clamping element of the lower half-arm, wherein the first intermediate lines of each arm are connected together, a command device for cut-off against an electrical overload, connected to all of the first lines to measure the first intermediate continuous voltage, the cut-off command device being configured to determine a fault by detecting if the first measured intermediate continuous voltage is outside of a nominal voltage variation range of said first intermediate voltage and to transmit a generalised opening command signal to all of the electronic commutation switches when the fault is determined.

In various aspects of the invention, one uses the intermediate voltage that is going to come out of a known voltage range corresponding to normal operation when a component of the arms of the inverter, in particular an electronic switch, is in the course of going into short-circuit. Thus, the system enables detection of a short-circuit very rapidly without detecting a false over-voltage detection. Indeed, multilevel inverters produce floating intermediate voltages and adjusted between the two positive and negative potentials of the continuous voltage source (HVDC); a SC type breakdown in an arm or a phase of the motor leads to a current path which causes an imbalance in the arm and brings the intermediate voltage outside of its normal excursion range and this is what is detected in the invention, by simple comparison with voltage thresholds delimiting the normal voltage range of the intermediate node. In the event of detection of such a fault, the cut-off command device thus transmits a generalised opening command signal for all of the electronic switches of the inverter to eliminate or prevent the fault coming from the faulty switch in a very rapid manner and thus before an important short-circuit current forms. The invention makes it possible to obtain a very rapid cut-off of the inverter, which makes it possible to avoid that the short-circuit fault leads to other faults in cascade in the other components and in particular the other electronic switches of the inverter, which could otherwise lead to a short-circuit on the continuous high voltage network. Thus the invention makes it possible to protect the other components of the inverter and to avoid a propagation of the short-circuit fault to the high voltage network. Further, for each intermediate voltage, a single measurement and comparison of this measurement with a nominal voltage range is necessary, which limits the number of components to integrate.

Apart from the characteristics that have been mentioned in the preceding paragraph, the electrical conversion system, according to an aspect of the invention may have one or more complementary characteristics among the following, considered individually or according to all technically possible combinations thereof:

According to an embodiment, each clamping element is formed by an electronic switch and the generalised opening command signal transmitted by the cut-off command device further commands the opening of the electronic switches each forming a clamping element when the fault is determined.

According to an embodiment, the cut-off command device transmits the generalised opening command signal to all of the electronic commutation switches and in the case of the preceding embodiment, also transmits this signal to the electronic switches forming a clamping element.

According to an embodiment, the system further comprises a driver of the inverter capable of transmitting command signals for closing and opening all of the electronic commutation switches at the switching frequency of the inverter, the driver comprising an opening forcing command input configured to force the opening of the electronic switches driven by the driver.

Beneficially, the cut-off command device is connected to the opening forcing command input and is configured to transmit the generalised opening command signal to said opening forcing command input, making it possible to command the opening of all the electronic switches driven by the driver, all the electronic switches comprising the electronic commutation switches and, if needs be, the electronic switches forming the clamping elements.

Beneficially, the driver is connected to the commands of the switches forming a clamping element and in that the driver is further configured to transmit the command signal for opening all of the switches forming a clamping element when it receives the generalised opening command signal.

According to an example of this embodiment, each set of intermediate lines of the phase arms connected together and each terminal connected to a continuous voltage bus forms a level line of the multilevel inverter and the driver is configured to, after having transmitted the command signal for opening all of the electronic commutation switches:

test each phase arm to determine a deteriorated phase arm comprising a defective electronic commutation switch and/or a deflective clamping element remaining still ON, and to determine for each level line if it is a defective level line or an operational level line, the level line being determined defective when its measured intermediate continuous voltage is outside of its nominal voltage variation range and the level line is determined as operational when its voltage is within its nominal voltage variation range and next pass into a degraded mode of the inverter, the driver comprising in this degraded mode a signal making it possible to command an opening of all the electronic switches of the phase arm determined as deteriorated, while commutating only the electronic switches of the other phase arms making it possible to use the level lines determined as operational.

According to an embodiment, the cut-off command device comprises a failure detection unit comprising at least one comparator to compare the first measured intermediate continuous voltage with its nominal voltage variation range and in that the cut-off command device transmits the generalised opening command signal when the failure detection unit detects the failure.

According to an example of this embodiment, the comparator is a window comparator configured to compare the measured intermediate voltage with a minimum threshold value and a maximum threshold value defining the nominal voltage variation range, the comparator transmitting at its output a signal of detection of out of range voltage if the first intermediate voltage is below the minimum threshold value and or above the maximum threshold value and in that the cut-off command device further comprises an analogue to digital converter connected to the output of said comparator, to transform the signal of detection of out of range voltage into a generalised opening command signal for the opening forcing command input of the driver.

According to an example of this embodiment, the cut-off device further comprises a parameter adjustment device to parameterise the minimum and maximum threshold values applied for the comparison with at least the first intermediate voltage.

According to an embodiment, the first intermediate voltage is a neutral voltage and the nominal voltage variation range of said intermediate voltage comprises the value 0.

According to an embodiment, the multilevel inverter is of Neutral Point Clamped NPC or Active Neutral Point Clamped ANPC type.

According to an embodiment, the number n of intermediate lines is strictly greater than 1, and in that the cut-off command device is connected to at least one second intermediate line having a second intermediate voltage to measure therein the voltage and to determine a fault by detecting if the value of the second measured intermediate voltage is outside of a second nominal voltage variation range of said second measured intermediate voltage and to transmit a generalised opening command signal to all of the electronic commutation switches and the clamping elements when the fault is determined.

According to another aspect of the invention, the invention further relates to a method for protecting against an electrical overload, comprising an electrical conversion system according to the invention (with or without the different characteristics of the embodiments described previously), comprising the steps of:

measurement of an intermediate continuous voltage,
determination of a fault by detecting if at least one measured intermediate continuous voltage is outside of a nominal voltage variation range of said intermediate voltage,
transmission of a generalised opening command signal to all the electronic commutation switches and the clamping elements when the fault is determined.

The invention and the different applications thereof will be better understood on reading the description that follows and by examining the figures that accompany it.

BRIEF DESCRIPTION OF THE FIGURES

The figures are presented for indicative purposes and in no way limit the invention.

FIG. 1a schematically represents an electrical conversion system according to a first embodiment of the invention comprising a three level inverter.

FIG. 1b schematically represents in greater detail the first arm of the inverter of the electrical conversion system according to the first embodiment of the invention represented in FIG. 1a.

FIG. 2 schematically represents an example of a first arm of a three level inverter of the electrical conversion system according to the first embodiment of the invention.

FIG. 3 schematically represents a first example of the electrical conversion system of the invention according to the first embodiment.

FIG. 4 schematically represents an example of a cut-off command device of the electrical conversion system of FIG. 3.

FIG. 5 schematically represents partially an electrical conversion system according to a second embodiment of the invention.

DETAILED DESCRIPTION

The figures are presented for indicative purposes and in no way limit the invention.

The invention is more particularly described with reference to a multilevel inverter topology of neutral point clamped type, whether of NPC type with loop diodes or ANPC type, actively neutral point clamped, by clamping elements. The invention is more particularly illustrated with reference to an ANPC topology and of which the clamping elements are electronic switches but they could also be diodes for an NPC inverter. Those skilled in the art will know how to make the necessary adaptations to implement the invention more generally to multilevel inverter topologies.

Generally speaking, the invention applies to inverters with n levels, n an integer greater than or equal to 3. Hereafter, the term "inverter" employed alone refers to a such a multilevel inverter, with n levels.

FIG. 1a represents a first embodiment of an electrical conversion system S1 comprising an inverter with 3 levels (n=3) of ANPC type connected to a supply source E.

The electrical conversion system S1 thus comprises the inverter 1a comprising a first terminal connected to a first power bar HVDC+, also called positive bar, of the DC voltage supply source E, for example 1000 volts DC, and a second terminal connected to a second power bar HVDC−, also called negative bar, of the supply source E, in this case earth.

Each DC voltage supply source E comprises a branch of capacitors, connected between the first and second power bars HVDC+, HVDC−. Here, in this example, the number of capacitors is thus two (i.e. a number n−1 of capacitors=2) capacitors C1, C2.

The inverter 1a comprises k phase arms $10_k$, one per phase of the electrical load in output, each connected in parallel between the first bar HVDC+, and the second power bar HVDC−. Hereafter, the term "arm" is more simply used. In FIG. 1a, three arms $10_1$, $10_2$, $10_3$ are represented in solid line and another arm $10_K$ is represented in dotted line to generalise the arms $10_k$, hereafter the index "$_K$" being the number of the arm.

Each arm $10_k$ comprises a phase output $PH_k$. Each arm $10_k$ comprises an upper half-arm $10H_k$ and a lower half-arm $10L_k$.

Here, in this example, the first, second and third arms $10_1$, $10_2$, $10_3$ thus comprises an upper half-arm respectively referenced $10H_1$, $10H_2$, $10H_3$ and a lower half-arm respectively referenced $10L_1$, $10L_2$, $10L_3$ and a phase output respectively referenced $PH_1$, $PH_2$, $PH_3$.

The inverter comprises components in each arm, differentiated according to two types according to their function: electronic commutation switches and clamping elements. FIG. 1b schematically represents the electrical conversion system S1 of which the electronic commutation switches and the clamping elements of the first arm $10_1$ are represented by blocks schematically. Each electronic commutation switch is designated hereafter by the letter Q and each clamping element is designated hereafter by the letter C, of which each of the letters Q and C is followed by an index i, then by the letter H or L depending on whether the component Q or C forms part of the upper or lower half-arm respectively, followed by the index k representing the number of the phase.

Each upper half-arm $10H_k$ thus comprises electronic commutation switches $Q_iH_k$, also called positive electronic commutation switches, mounted in series between the first bar HVDC+ the phase output $PH_k$ and each half-arm $10L_k$ comprises electronic commutation switches $Q_iL_k$, also called negative electronic commutation switches, mounted in series between the second bar HVDC− and the phase output $PH_k$.

Hereafter, the index "i" represents the number of the type of component (electronic commutation switch or clamping element) of a half-arm $10H_k$, $10L_k$ (here the electronic commutation switches $Q_iH_k$, $Q_iL_k$). As explained above, the letter H represents the components of each upper half-arm $10H_k$, the letter L represents the components of each lower half-arm $10L_k$.

In FIG. 1b, only two schematic blocks of the positive $Q_iH_1$ and negative $Q_iL_1$ electronic commutation switches of the first arm $10_1$ of the three arms are represented.

In an ANPC or NPC type inverter, the number of electronic commutation switches $Q_iH_k$, $Q_iL_k$, per half-arm $10L_k$ is equal to n−1, i.e. the number n of levels minus one.

Each upper $10H_k$ and lower $10L_k$ half-arm also comprises clamping elements respectively upper and lower $C_iH_k$ and $C_iL_k$.

Each arm $10_k$ of an inverter comprises an intermediate line having a first intermediate voltage V1 between a pair of clamping elements comprising an upper clamping element $C_iH_k$ and a lower clamping element $C_iL_k$. The number of intermediate lines having an intermediate voltage is equal to the number of levels minus two. Here, in this case the inverter 1a being with three levels, it comprises a single intermediate line per arm $10_k$. Each intermediate line has the same first intermediate voltage V1. Indeed, all the intermediate lines are connected together between the two capacitors C1 and C2 mounted in series with the voltage source E, each having a voltage equal to the voltage of the source divided by two. In this embodiment, the first intermediate voltage V1 is thus the neutral. In the case of an odd number of levels greater than 3, for example 5 as will be explained hereafter in relation to FIG. 5, the first intermediate voltage has as position the neutral, a second intermediate voltage of another intermediate line is positive and a third intermediate voltage of another intermediate line is negative. In the case of an even number of levels greater than 3, there does not exist a first intermediate voltage V1 which has the position of neutral but only at least one intermediate line having at least one voltage in positive position and at least one other intermediate line having a voltage in negative position (position of a voltage is taken to mean its polarity and its value compared to other intermediate voltages of same polarity).

The branch of capacitors thus defines n−2 intermediate voltages of the inverter, thus corresponding to n−2 lines having one intermediate voltage per arm $10_k$.

The three level inverter thus comprises three level lines, a first level line at the level of the first terminal, a second level line at the level of the second terminal and a third level line at the level of the intermediate line.

Each upper and lower clamping element $C_iH_k$, $C_iL_k$ of each respectively upper $10H_k$ and lower $10Lk$ half-arm, is connected between two respectively positive $Q_iH_k$ and negative $Q_iL_k$, electronic commutation switches of each half-arm respectively upper $10H_k$ and lower $10Lk$. Here, in this example, only two schematic blocks of the upper and lower clamping elements $C_iH_1$, $C_iL_1$ of the first arm $10_1$ of the three arms are represented.

FIG. 2 schematically and partially represents an exemplary electrical conversion system S1, comprising the details of the schematic blocks of the upper and lower clamping elements $C_iH_1$, $C_iL_1$ and schematic blocks of the positive $Q_iH1$ and negative $Q_iL_1$ electronic commutation switches of the first arm $10_1$ of the inverter 1A with three levels of FIG. 1a. In this example, the clamping elements $C_iH_k$, $C_iL_k$ are also electronic switches, hereafter called "clamping element electronic switches" or instead "electronic switches forming the clamping elements $C_iH_k$, $C_iL_k$". The inverter illustrated in this figure is thus here of ANPC type; but the inverter could also be an NPC inverter and the clamping elements $C_iH_k$, $C_iL_k$ could be diodes.

The electronic commutation switches $Q_iH_k$, $Q_iL_k$ and the clamping elements $C_iH_k$, $C_iL_k$ are in the example wide bandgap electronic switches and, in this case, the symbol used corresponds to electronic switches made of silicon carbide SiC. Electronic switches made of gallium nitride GaN could also be used. Each electronic commutation switch $Q_iH_k$, $Q_iL_k$ and clamping element $C_iH_k$, $C_iL_k$ thus comprises an intrinsic diode mounted in anti-parallel.

Thus, it may be seen that the first arm $10_1$ of this example of ANPC inverter with 3 levels, comprises in the upper half-arm $10H_1$ two positive electronic commutation switches $Q_1H_1$, $Q_2H_1$, in series connected between the positive Bar HVDC+ and the phase output $PH_1$. The first arm $10_1$ comprises in the lower half-arm $10L_1$ two negative electronic commutation switches $Q_1L_1$, $Q_2L_1$, in series connected between the negative HVDC bar and the phase output $PH_1$. The first arm $10_1$ further comprises a pair of clamping elements $C_1H_1$, $C_1L_1$ in series forming between them (mid-point) a first line having an intermediate voltage V1 connected between the two capacitors C1 and C2. The upper clamping element $C_1H_1$ is further connected between the two positive electronic commutation switches $Q_1H_1$, $Q_2H_1$, and the lower clamping element $C_1L_1$ is further connected between the two negative electronic commutation switches $Q_1L_1$, $Q_2L_1$.

The inverter 1a further comprises a driver 3 capable of transmitting command signals $G_1$, $G_2$, $G_3$, $G_k$ (visible in FIG. 1a) for closing and opening all the electronic commutation switches QiHk, QiLk of each arm $10_1$, $10_2$, $10_3$ $10_k$ at the switching frequency of the inverter 1a.

In the application, the term "driver" designates, in a usual manner, a command unit making it possible to produce a signal to command an electronic switch making it possible to command it in commutation, from an open state (transistor blocked) to a closed state (transistor saturated) or vice versa, or instead to command it in a linear regime.

In this case here, since the inverter 1A of this example is of ANPC type, the driver 3 also controls the clamping elements $C_iH_k$, $C_iL_k$. In FIG. 2, the command G1 of the driver thus represents all of the commands of the electronic commutation switches $Q_iH_1$, $QiL_1$ and the clamping elements $C_1H_1$, $C_1L_1$, including a command $GQ_1H_1$ for the electronic commutation switch $Q_1H_1$, a command $GC_1H_1$ for the electronic switch of the clamping element $C_1H_1$, etc.

In this example, the electronic switches being made of silicon carbide SiC, the command is a gate voltage applied to the electronic switch, for example between −5V/20V.

The electrical conversion system S1 further comprises a cut-off command device 2 for cut-off against an electrical overload, schematically represented in FIGS. 1a, 1b and 2 and of which an example is represented in FIG. 3.

The cut-off command device 2 is connected to all of the first lines of each arm $10_k$ to measure the first intermediate continuous voltage V1. The cut-off command device 2 is configured to determine a fault by detecting if the measured first intermediate continuous voltage V1 is outside of a nominal voltage variation range [$Vmax_1$, $Vmin_1$] of said first intermediate voltage V1.

The cut-off command device 2 comprises in this example a failure detection unit 21 to detect a failure if the first measured intermediate continuous voltage V1 is outside of the nominal voltage variation range [$Vmax_1$, $Vmin_1$] for a nominal operation without breakdown of the inverter, in other words a voltage range at the level of the third level line corresponding to each intermediate line of each arm $10_k$ corresponding to a normal operation, without SC type fault. The nominal voltage variation range depends in practice on the position of the measured nominal intermediate voltage, on the topology of the inverter and on the technology of the different electronic components, in particular the technology of the electronic switches. Here, in this example, the measured nominal intermediate voltage being a neutral, the nominal voltage variation range comprises the zero volt, for example more or less 20 volts. The range of variation may have its minimum and maximum thresholds adjustable over the whole HVDC voltage range.

The failure detection unit 21 of this example comprises a comparator 210 comparing the value of the first measured intermediate voltage V1 with a minimum threshold value $Vmin_1$, in this case here of negative value for example –20V, and with a maximum threshold value $Vmax_1$, in this case here of positive value for example +20V. Said minimum $Vmin_1$ and maximum $Vmax_1$ threshold values define the nominal voltage variation range [$Vmax_1$, $Vmin_1$].

It will be appreciated that other possibilities of typologies of failure detection unit 21 may be implemented such as, for example, a comparison of the measured value in absolute value with a single threshold value or instead between two threshold detection circuits (one for the minimum threshold and the other for the maximum threshold).

The cut-off command device 2 is configured to transmit a generalised opening command signal 221 for the opening of all the electronic commutation switches $Q_iH_k$, $Q_iL_k$ and, in this case in this example, to the electronic switches forming the clamping elements $C_iH_k$, $C_iL_k$ when the fault is determined. In this first embodiment, the cut-off command device 2 is connected to an opening forcing command input of the driver 3 to transmit thereto at the output the generalised opening command signal 221 so that the driver 3 transmits the commands for opening G1, G2, G3, Gk all of the electronic commutation switches QiHk, QiLk and further in this example to the electronic switches forming the clamping elements $C_iH_k$, $C_iL_k$. In this example represented, the cut-off command device 2 thus transmits the generalised opening command signal 221 to all of the electronic commutation switches $Q_iH_k$, $Q_iL_k$ through the driver 3 when the failure detection unit 21 detects the failure. According to another example, not represented, the cut-off command device 2 transmits the generalised opening command signal 221 directly to all of the electronic commutation switches $Q_iH_k$, $Q_iL_k$ and, in this case in this example, to the electronic switches forming the clamping elements $C_iH_k$, $C_iL_k$.

For example, in the case where the clamping element $C_1H_1$ of the first upper half-arm $10H_1$ becomes defective while remaining ON (it remains closed or it has a low resistance), and that the positive commutation switch $Q_1H_1$ of this first arm $10_1$ is commanded in the closed state, the capacitor C1 is going to be shunted by the circuit formed by these two components, forming a short-circuit. This short-circuit furthermore risks making the positive commutation switch $Q_1H_1$ defective. The intermediate voltage V1 is thus going to be at the same value (more or less the low resistance of the two defective components) as the voltage of the first power bar HVDC+. Without cut-off command device 2, during the commutation of the positive commutation switch $Q_2H_1$ to obtain the intermediate voltage V1, the voltage will be that of the voltage of the first power bar HVDC+, being able to propagate faults to the other components of the inverter and to propagate the short-circuit to the high voltage network between the first and the second power bar. In the same way, in the event of fault, the commutation of the negative commutation switch $Q_2L_1$ could propagate faults to the other components of the inverter and propagate the short-circuit to the high voltage network between the first and the second power bar.

The cut-off command device 2 of the system S1 is thus going to measure a rise in voltage of the intermediate voltage V1 very rapidly beyond its nominal voltage variation range [$Vmax_1$, $Vmin_1$] and thus send the generalised opening command signal 221 to the driver 3. The driver 3 is thus going to command the opening of all the components of the arms, in this case the electronic commutation switches $Q_iH_k$, $Q_iL_k$ and the clamping elements $C_iH_k$ and $C_iL_k$ of each arm. The short-circuit is thus not going to bring about other faults of components and will not propagate between the first and the second power bars.

FIG. 4 schematically represents a more detailed example of the cut-off command device 2, in particular the failure detection unit 21 of this example.

The failure detection unit 21 optionally comprises in this example a measurement adaptor 211 of the first measured intermediate voltage V1 to adapt it into a voltage adapted V10 to the comparator 210. The adapted voltage V10 is an image of the measured intermediate voltage V1. Hereafter, when one speaks of comparison of the measured voltage V1, this may be its image which is in this example the voltage adapted by the measurement adaptor 211. This makes it possible to adapt the first measured intermediate voltage V1 to the comparator 210 and thus to have a failure detection unit 21 compatible with different typologies of multilevel inverters. The measurement adaptor 211 may thus enable a user to adjust the measured value to adapt it to the comparator of the cut-off command device 2 of the inverter.

The comparator 210 is in this example a window comparator configured to compare the measured intermediate voltage V1 (in this case thus the adapted voltage V10 which is the image of the measured intermediate voltage V1) at the minimum threshold value Vmin1 and the maximum threshold value Vmax1. The comparator 210 transmits at its output a signal of detection of out of range voltage 212 if the first intermediate voltage V1 is below the minimum threshold value Vmin1 or above the maximum threshold value Vmax1.

The cut-off command device 2 further comprises an analogue to digital converter 22 connected to the output of said comparator 210, to transform the signal of detection of out of range voltage 212 into a generalised opening command signal 221 applied to an opening forcing command input of the driver 3. In other words, the analogue to digital converter 22 converts the signal at the output of said comparator 210 into a signal adapted for the driver 3.

When the driver 3 has commanded the opening of all the components of the inverter 1a, which is thus off, the conversion system S1 may be configured to next apply different strategies.

A first strategy may be quite simply to maintain the inverter off.

A second strategy may be to apply a first degraded mode of the inverter by commutating the switches of the functional phase arms $10_k$ so as to provide the voltage levels in phase output without passing through the defective components of the deteriorated phase arm and without this phase arm $10_k$ having the defective components. In this second strategy, the driver 3 can test each phase arm $10_k$ to determine a phase arm deteriorated by its defective components and determine for each level line if it is a defective level line or an operational level line, the level line being determined defective when its measured intermediate continuous voltage is outside of its nominal voltage variation range and determined as operational when its measured intermediate continuous voltage is within its nominal voltage variation range. Next, the driver 3 can use the inverter by commanding or by keeping in the open state all of the switches of the phase arm $10_k$ determined as deteriorated, while commutating the switches of the other phase arms $10_k$ in the degraded mode wherein each switch of the other phase arms $10_k$ is commanded without commanding the use of the level line determined defective. "Without commanding the use of the defective level line" is taken to mean that the switches which are commutated are done so using only the operational level lines.

Finally, a third strategy may be to apply a degraded operating mode of each arm $10_k$ of the inverter without commanding the defective level line on the half-phase arms $10H_k$, $10L_k$ of each phase. Thus, in this third strategy, each phase arm $10_k$ is commanded by the driver with only the operational level lines, i.e. with at least one level line less. The level line less corresponds to the capacitor connected to the defective components. In this third strategy, the driver 3 can test each phase arm $10_k$ to determine the defective component(s) and to determine for each level line if it is a defective level line or an operational level line, the level line being determined defective when the level line makes it possible by passing through the components determined as defective to supply the phase output according to the voltage level of the level line. Next, the driver 3 can command the inverter in a degraded arms mode according to the defective component(s), while eliminating the use of the defective level line in one of the two half-arms of the arm comprising the defective components(s). For example, in the case of the first embodiment of the electrical conversion system S1 comprising an inverter 1A with three levels having the arm $10k$ determined as having defective components, the driver 3 can command the arm $10k$ according to the table below:

commutation switch $Q_1L_1$ will be always commanded closed and finally the second negative commutation switch $Q_2L_1$ as well as the switch forming the lower clamping element $C_1L_1$ are each commanded in commutation.

It will be appreciated that these six cases apply to each phase arm. Further, in the event of non-identified case, the driver 3 can pass to the second strategy or even to the first strategy.

The different strategies of the electrical conversion system can also apply to inverters having more than three levels. When an arm comprises a number n of levels greater than 3 (i.e. several intermediate levels), the failure detection device 21 may be connected to several intermediate level lines to measure each intermediate voltage level.

FIG. 5 represents an electrical conversion system S2 according to a second embodiment comprising an ANPC inverter 1B with five levels of which only the first arm $10_1b$ is represented in a detailed manner. The ANPC inverter 1B with five levels is identical to the inverter 1a except in that it comprises four capacitors C1, C2, C3 and C4 forming between them three intermediate voltages: a first V1, a second V2 and a third V3. The first intermediate voltage V1 is as in the first embodiment the neutral voltage but is obtained between the second capacitor C2 and the third capacitor C3. Further, the arm $10_1b$ comprises four positive electronic commutation switches $Q_1H_1$, $Q_2H_1$, $Q_3H_1$, $Q_4H_1$ mounted in series between the phase output PH1 and the first power bar HVDC+, and four negative electronic commutation switches $Q_1L_1$, $Q_2L_1$, $Q_3L_1$, $Q_4L_1$ mounted in series between the phase output PH1 and the second power bar HVDC−. Further, the arm $10_1b$ comprises three pairs of clamping elements each forming an intermediate level line between the two clamping elements of each pair, at the corresponding intermediate voltage V1, V2, V3.

The first pair comprises two electronic switches forming clamping element $C_1H_1$, $C_1L_1$ and which are connected together (mid-point) to a second intermediate level line having the second intermediate voltage V2 obtained between the two capacitors C1 and C2, such that the switch forming the upper clamping element $C_1H_1$, is also connected between the first and second positive electronic commutation switches $Q_1H_1$ and $Q_2H_1$ and the switch forming the lower clamping element $C_1L_1$ is also connected between the first and second negative electronic commutation switches $Q_1L_1$ and $Q_2L_1$.

Like the first pair, the second pair, respectively the third pair, comprises two switches forming the clamping elements $C_2H_1$ and $C_2L_1$, respectively $C_3H_1$ and $C_3L_1$ connected together (mid-point) to the first line having the first inter-

TABLE 1

| Component | case 1 | case 2 | case 3 | case 4 | case 5 | case 6 |
|---|---|---|---|---|---|---|
| $Q_1H_1$ | SC | closed or SC | commutation | commutation | commutation | closed |
| $C_1H_1$ | closed or CC | SC | commutation | commutation | commutation | closed |
| $Q_2H_1$ | open | open | SC | closed | closed | open |
| $C_1L_1$ | commutation | commutation | closed | SC | closed or SC | commutation |
| $Q_2L_1$ | commutation | commutation | closed | closed or SC | SC | commutation |
| $Q_1L_1$ | closed | closed | open | open | open | SC |

For example, in case 1, the first positive commutation switch $Q_1H_1$ is determined as the component defective in short-circuit SC (still ON), the switch forming the upper clamping element $C_1H_1$ is commanded still closed and can become defective in short-circuit SC or is already defective in short-circuit SC, the second positive commutation switch $Q_2H_1$ will be always commanded open, the first negative mediate voltage V1, respectively a third line having the third intermediate voltage V3, between the capacitors C2 and C3, respectively between the capacitors C3 and C4. Further, in the first pair, respectively second pair, the switch forming the upper clamping element, $C_2H_1$, respectively $C_3H_1$, is also connected between the second and the third positive electronic commutation switch $Q_2H_1$ and $Q_3H_1$, respectively between the third and the fourth positive electronic commutation switch $Q_3H_1$ and $Q_4H_1$. Finally, the switches forming the lower clamping elements $C_2L_1$, respectively $C_3L_1$ of each of these two pairs, are also each respectively connected the first between the second and the third negative electronic commutation switch $Q_2L_1$, $Q_3L_1$ and the second between the third and the fourth negative electronic commutation switch $Q_3L_1$ and $Q_4L_1$.

The electrical conversion system S2 comprises a cut-off device 2b identical to the cut-off device 2 of the first embodiment except in that the failure detection device 21b is connected to the three lines having intermediate voltages, V1, V2, V3 to each measure their continuous voltage and to determine a fault by detecting if one of the measured intermediate continuous voltages V1, V2 V3 is outside of its respective nominal voltage variation range [Vmax1, Vmin1] [Vmax2, Vmin2] [Vmax3, Vmin3].

The failure detection device 21b may comprise for each measured voltage a comparator 210 as described in the first embodiment and potentially a measurement adaptor 211.

The failure detection device 21b is also configured to produce a generalised opening command signal 221 when it detects that one at least of the measured continuous voltages V1, V2 V3 is outside of its nominal voltage variation range [Vmax1, Vmin1] [Vmax2, Vmin2] [Vmax3, Vmin3].

The cut-off device 2b comprises in this example, as in that of the system of the first embodiment, an analogue to digital converter 22 connected to the failure detection device 21b to transform the signal of detection of out of range voltage 212 into a generalised opening command signal 221 transmitted and applied to the driver 3b of this electrical conversion system S2. The driver 3b comprises, like the driver 3 of the first embodiment, outputs to transmit closing and opening command signals (G1, G2, G3, Gk), it being understood that the driver 3 comprises more command outputs per arm since there are more switches to command.

Finally, in this example, the cut-off device 2b further comprises a determination unit 29b to make it possible to pre-set each of the nominal voltage variation ranges. Such a determination unit 29b may be of type with automatic determination, that is to say capable of identifying in an autonomous manner a nominal voltage variation range of an intermediate voltage; or instead be of adjustable or programmable type, as a function of the considered voltage range HVDC (i.e. between HVDC+ and HVDC−).

The electrical conversion system of which several exemplary embodiments S1, S2 have been described and the method of protection according to the invention are particularly well suited to aeronautical applications, in particular to supply alternating loads from the on-board high voltage DC networks, making it possible to protect in an efficient manner these electrical networks in the event of short-circuit type failure. Indeed, the detection is very rapid and simple to carry out and to integrate because it involves a simple voltage measurement and the associated protection command may be beneficially and easily implemented using components of the inverter itself (electronic switches and command drivers). In other words, it is a not very bulky circuit easy to integrate in inverter topologies.

An aspect of the invention also relates to a method for protecting against an electrical overload, comprising the electrical conversion system S1 or S2 according to the different examples of the two embodiments described, comprising a first step of measuring at least one intermediate continuous voltage V1, V2, V3.

The method further comprises after a second step of determination of a fault by detecting if at least one measured intermediate continuous voltage V1 is outside of a nominal voltage variation range [Vmax1, Vmin1] determined for said intermediate voltage V1 and a third step of transmission of a generalised opening command signal 221 to all of the electronic commutation switches QiHk, QiLk and the clamping elements CiHk, CiLk when the fault is determined.

The invention claimed is:

1. An electrical conversion system comprising:
an inverter arranged according to a multilevel type topology with k identical arms mounted in parallel with respect to one another between a first terminal and a second terminal of a continuous voltage bus supplied by a DC voltage supply source each comprising a phase output, k being an integer greater or equal to 3, wherein at least two capacitors are connected in series between said first and second terminals of the continuous voltage bus, each arm comprising:
an upper half-arm comprising at least a first and a second upper electronic commutation switch forming between them a first electrical node and at least one clamping element connected between the first electrical node and a second electrical node, the upper half-arm being connected to the first terminal of the continuous voltage bus to supply a positive supply voltage to the phase output, and
a lower half-arm comprising at least a first and a second lower electronic commutation switch forming between them a third electrical node and at least one clamping element connected between the third electrical node and the second electrical node, the lower half-arm being connected to the second terminal of the continuous voltage bus to supply a negative supply voltage to the phase output, and
a first intermediate line having a first intermediate continuous voltage connected to the second electrical node,
wherein the first intermediate lines of each arm are connected together, and to the second electrical node, between the at least two capacitors;
a cut-off command device against an electrical overload, being configured to measure the first intermediate continuous voltage between the at least two capacitors to determine a fault by detecting if the first measured intermediate continuous voltage is outside of a nominal voltage variation range [Vmax1, Vmin1] of said first intermediate voltage and to transmit a generalised opening command signal for the opening of the electronic commutation switches when the fault is determined.

2. The electrical conversion system according to claim 1, wherein each clamping element is formed by an electronic switch and the generalised opening command signal transmitted by the cut-off command device further commands the opening of the switches each forming a clamping element when the fault is determined.

3. The electrical conversion system according to claim 2, further comprising a driver of the inverter configured to transmit command signals for closing and opening all of the electronic commutation switches at the switching frequency of the inverter, the driver comprising an opening forcing command input configured to force the opening of the electronic switches driven by the driver of the cut-off command device, the cut-off command device being connected to the opening forcing command input and is configured to transmit the generalised opening command signal to the opening forcing command input, making it possible to command the opening of all the electronic switches driven by the driver, all the electronic switches comprising the electronic commutation switches and the electronic switches forming the clamping elements.

4. The electrical conversion system according to claim 3 wherein the driver is connected to the commands of the switches forming a clamping element and the driver is configured to further transmit the command signal for opening all of the switches forming a clamping element when it receives the generalised opening command signal.

5. The electrical conversion system according to claim 1, wherein the cut-off command device comprises a failure detection unit comprising at least one comparator to compare the first measured intermediate continuous voltage with its nominal voltage variation range [$Vmax_1$, $Vmin_1$] and wherein the cut-off command device is configured to transmit the generalised opening command signal when the failure detection unit detects the failure.

6. The electrical conversion system according to claim 1, wherein the first intermediate voltage is a neutral voltage and in that the nominal voltage variation range [Vmax1, Vmin1] of said intermediate voltage comprises the value 0.

7. The electrical conversion system according to claim 1, wherein the multilevel inverter is of Neutral Point Clamped NPC or Active Neutral Point Clamped ANPC type.

8. The electrical conversion system according to claim 1, wherein a number n of intermediate lines is strictly greater than 1, and wherein the cut-off command device is connected to at least one second level line having a second intermediate voltage to measure therein the voltage and to determine a fault by detecting if the value of the second measured intermediate voltage is outside of a second nominal voltage variation range [Vmax2, Vmin2] of said measured second intermediate voltage and to transmit a generalised opening command signal to all of the electronic commutation switches and the clamping elements when the fault is determined.

9. The electrical conversion system according to claim 1, wherein the electronic commutation switches of the inverter are wide bandgap semiconductor components.

10. A method for protecting against an electrical overload, comprising an electrical conversion system according to claim 1, comprising:
    measuring an intermediate continuous voltage,
    determining a fault by detecting if at least one measured intermediate continuous voltage is outside of a nominal voltage variation range [$Vmax_1$, $Vmin_1$] of said intermediate continuous voltage, and
    transmitting a generalised opening command signal to all of the electronic commutation switches and clamping elements when the fault is determined.

11. An electrical conversion system, comprising:
    an inverter arranged according to a multilevel type topology with k identical arms mounted in parallel with respect to one another each comprising a phase output, k being an integer greater or equal to 3, each arm comprising:
        an upper half-arm comprising electronic commutation switches and clamping elements connected to a first terminal of a continuous voltage bus to supply a positive supply voltage to the phase output and
        a lower half-arm comprising electronic commutation switches and clamping elements connected to a second terminal of a continuous voltage bus to supply a negative supply voltage to the phase output,
        a first intermediate line having a first intermediate continuous voltage between a clamping element of an upper half-arm and a clamping element of the lower half-arm,
    wherein the first intermediate lines of each arm are connected together, each set of intermediate lines of the phase arms connected together forms a level line of the multilevel inverter and each terminal connected to a continuous voltage bus forms a level line of the multilevel inverter and
    a cut-off command device against an electrical overload, connected to all of the first intermediate lines to measure the first intermediate continuous voltage, the cut-off command device being configured to determine a fault by detecting if the first measured intermediate continuous voltage is outside of a nominal voltage variation range of said first intermediate voltage and to transmit a generalised opening command signal for the opening of the electronic commutation switches when the fault is determined,
    a driver of the inverter capable of transmitting command signals for closing and opening all of the electronic commutation switches at the switching frequency of the inverter, the driver comprising an opening forcing command input configured to force the opening of the electronic switches driven by the driver of the cut-off command device, the cut-off command device being connected to the opening forcing command input and is configured to transmit the generalised opening command signal to the opening forcing command input, making it possible to command the opening of all the electronic switches driven by the driver, all the electronic switches comprising the electronic commutation switches and notably the electronic switches forming the clamping elements, and wherein the driver is configured to, after having transmitted the opening forcing command for opening all of the electronic commutation switches:
        test each phase arm to determine a deteriorated phase arm comprising a defective electronic commutation switch and/or a defective clamping element remaining still ON and to determine for each level line if it is a defective level line or an operational level line, the level line being determined defective when its measured intermediate continuous voltage is outside of its nominal voltage variation range and the level line is determined as operational when its measured intermediate continuous voltage is within its nominal voltage variation range and next,
        pass into a degraded mode of the inverter, the driver comprising in the degraded mode a signal to command an opening of all the electronic switches of the phase arm determined as deteriorated, while commutating the electronic switches of the other phase arms to use the level lines determined as operational.

12. An electrical conversion system, comprising:
    an inverter arranged according to a multilevel type topology with k identical arms mounted in parallel with respect to one another each comprising a phase output, k being an integer greater or equal to 3, each arm comprising:
        an upper half-arm comprising electronic commutation switches and clamping elements connected to a first terminal of a continuous voltage bus to supply a positive supply voltage to the phase output and
        a lower half-arm comprising electronic commutation switches and clamping elements connected to a second terminal of a continuous voltage bus to supply a negative supply voltage to the phase output, a first intermediate line having a first intermediate continuous voltage between a clamping element of an upper half-arm and a clamping element of the lower half-arm, wherein the first intermediate lines of each arm are connected together, a cut-off command device against an electrical overload, connected to all of the first intermediate lines to measure the first intermediate continuous voltage, the cut-off command device:

being configured to determine a fault by detecting if the first measured intermediate continuous voltage is outside of a nominal voltage variation range of said first intermediate voltage and to transmit a generalised opening command signal for the opening of the electronic commutation switches when the fault is determined, comprises a failure detection unit comprising at least one comparator to compare the first measured intermediate continuous voltage with its nominal voltage variation range and in that the cut-off command device transmits the generalised opening command signal when the failure detection unit detects the failure, wherein the comparator is a window comparator configured to compare the measured intermediate voltage with a minimum threshold value ($Vmin_1$) and a maximum threshold value ($Vmax_1$) defining the nominal voltage variation range [$Vmax_1$, $Vmin_1$], the comparator transmitting at its output a signal of detection of out of range voltage if the first intermediate voltage is below the minimum threshold value ($Vmin_1$) and or above the maximum threshold value ($Vmax_1$) and wherein the cut-off command device further comprises an analogue to digital converter connected to the output of said comparator, to transform the signal of detection of out of range voltage into a generalised opening command signal for the opening forcing command input of the driver.

* * * * *